Nov. 21, 1961  C. A. DODEGGE  3,009,493
POWER TOOL ASSEMBLIES
Filed Aug. 18, 1958  7 Sheets-Sheet 1

INVENTOR.
CARL A. DODEGGE
BY
Wallace and Cannon
ATTYS.

Nov. 21, 1961 C. A. DODEGGE 3,009,493
POWER TOOL ASSEMBLIES
Filed Aug. 18, 1958 7 Sheets-Sheet 7

INVENTOR.
CARL A. DODEGGE
BY Wallace and Cannon
ATTYS.

United States Patent Office 3,009,493
Patented Nov. 21, 1961

3,009,493
POWER TOOL ASSEMBLIES
Carl A. Dodegge, Maywood, Ill., assignor to Aero Metal Products Corporation, Chicago, Ill., a corporation of Illinois
Filed Aug. 18, 1958, Ser. No. 756,271
5 Claims. (Cl. 144—1)

This invention relates to power tools and particularly to hand-operated power tool assemblies of the kind in which a number of different tool attachments are driven from a single motor unit. The present application is a continuation in part of application Serial No. 736,845 filed May 21, 1958 and formally abandoned.

Power tools for domestic use have enjoyed increasingly greater popularity in recent years. A great many hand-operated power tools, and particularly hand-operated power drills, have been sold for domestic or other non-professional use. In addition, a number of manufacturers have furnished a variety of different tool units which may be employed with a hand-operated power drill or the like for other work purposes.

Among the attachments currently available for use with a power drill or like device are planers, oscillating sanders, saber saws, and even hedge trimmers. Usually, an attachment of this kind includes a drive shaft which is mechanically connected to the power drill or other power unit by means of the conventional chuck which forms a part of the drill. In most such arrangements, it is also necessary to afford some kind of mounting bracket to mount the attachment on the power drill. A mounting bracket of this kind may, for example, comprise a clamp which embraces the motor housing of the drill and which is secured thereto by means of bolts, nuts, or similar fastening devices.

Although tool attachments of this kind make it possible to operate a number of different tools from a single power source, the tool units themselves have generally proved rather difficult to operate and the work done by the tool units has not been particularly satisfactory. There are a number of reasons for the difficulties and disadvantages encountered in this field. In the first place, it is extremely difficult to afford a mounting bracket of conventional type which relieves all strain from the input shaft of the tool attachment. In most instances, a part of the weight of the tool attachment is borne by the shaft, leading to rapid wear and deterioration of the attachment and of the drill used therewith.

Another substantial difficulty relates to the problem of vibration. In many instances, the mounting bracket for the tool attachment is not capable of accurately aligning the tool attachment shaft with the chuck of the power drill. When these two members are somewhat out of alignment, the unit may tend to vibrate excessively. Furthermore, the misalignment may cause the tool attachment to operate in erratic and undesirable manner.

Another disadvantage presented by conventional tool attachments relates to safety of these attachments when placed in operation. With conventional mounting arrangements, the chuck or other connector and the input end of the attachment shaft are exposed. The rapidly rotating chuck and shaft consequently constitute a constant danger to the user of the tool. In addition, the relatively large spacing between the power drill and the tool attachment, in conventional devices, frequently makes the attachment relatively awkward to use and consequently affords some danger to the user as well as preventing efficient and accurate operation of the attachment. Moreover, in virtually all instances, a substantial amount of time and effort is required to change over from operation of a drill, for example, to a sander, planer, or other tool attachment.

A principal object of the invention, therefore, is a new and improved power tool assembly which effectively and inherently eliminates or minimizes the above-noted disadvantages of prior art devices.

A more specific object of the invention is a new and improved power tool mounting structure, for coupling a tool unit to a power unit, which effectively encloses all rotating parts in the power connection.

Another object of the invention is a new and improved power tool assembly, comprising a motor unit and a tool unit, in which the tool unit is rigidly removably mounted upon the motor unit simply by moving the two units into alignment with each other and rotating the two units through an angle of less than 360° and preferably less than 180° with respect to each other.

Another object of the invention is a new and improved power tool assembly system which affords an effective and convenient means for mounting a power unit upon a stationary stand, upon a tool unit or attachment, or directly upon a rotary tool with a minimum of time and effort on the part of the tool user.

A further object of the invention is a new and improved mounting and connecting arrangement for power tool attachments which is extremely inexpensive in construction yet convenient in use and which affords a more stable mounting arrangement than available in previously known devices.

Other and further objects of the present invention will be apparent from the following description and claims and are illustrated in the accompanying drawings which, by way of illustration, show preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention.

Figures 1, 2, 3, 4:
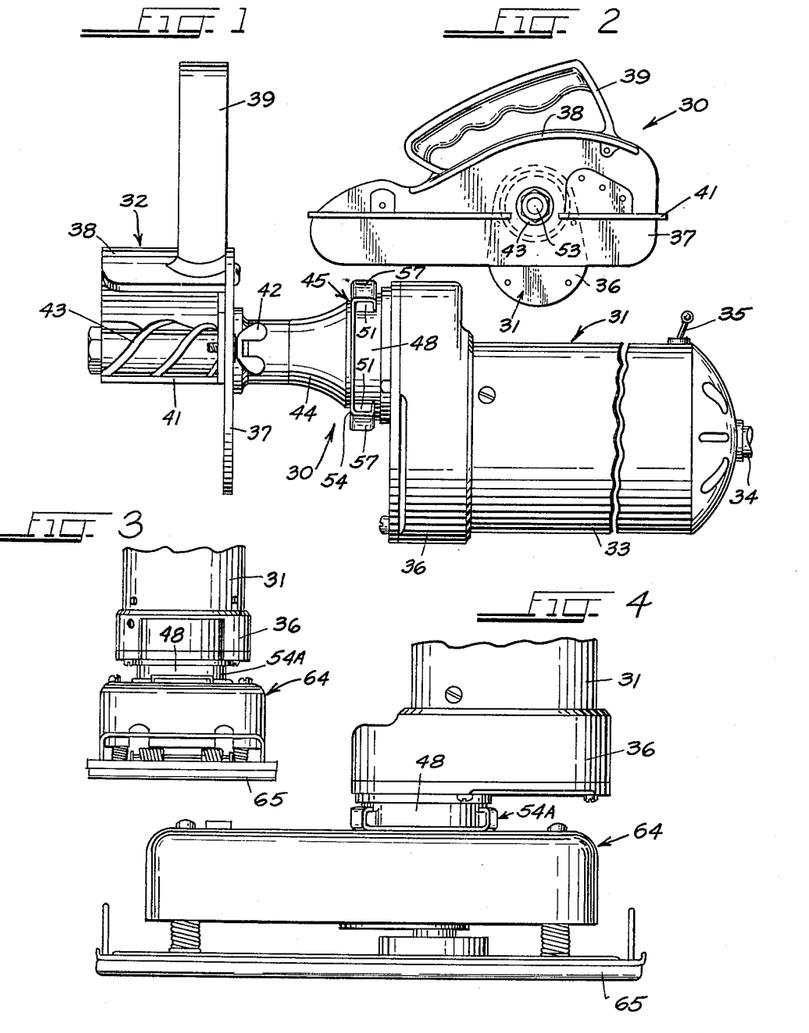
FIG. 1 is a side elevation view of a power tool assembly constructed in accordance with one embodiment of the invention and comprising a planer attachment mounted in operative position upon a power unit.
FIG. 2 is an end elevation view of the planer of FIG. 1.
FIG. 3 is an end elevation view of a power tool assembly, in this instance comprising an oscillating sander, constructed in accordance with the inventive concept.
FIG. 4 is a side elevation view of the sander of FIG. 3.

FIGS. 1 and 2 illustrate a planer 30 constructed in accordance with one embodiment of the invention. The planer 30 comprises a power unit 31 and a tool unit or attachment 32, the tool unit being mounted upon and driven from the power unit. The rear cylindrical portion 33 of the power unit housing encompasses an electrical motor, preferably of the universal type, which may be connected to a suitable electrical supply source as by a power cord 34. A control switch 35 is mounted on the motor section of the power unit housing and is electrically connected to the motor in the usual manner. The forward or output end of the power unit 31 comprises a gear box 36 which constitutes a continuation of the housing 33 and which encompasses a substantially conventional speed reduction gearing arrangement.

The tool unit 32, in this instance, comprises a support and guide plate 37 to which a curved guard 38 is affixed. A handle 39 is mounted on the guard 38 and is utilized to move the tool unit along a work piece during use of the planer. A horizontal guide plate 41 is adjustably mounted upon the support plate 37 by suitable means, such as the wing nut 42, to control the depth of the cut made by the planer. The cutting tool 43 of the planer is of conventional construction and is mounted upon an operating shaft which extends through a shaft housing 44.

As thus far described, the power tool assembly 30 is substantially conventional in construction and in operation. Thus, the motor in the power unit 31 may be energized to drive the shaft for the cutter 43 of the planer. The planer is engaged with a work piece in a position determined by the guide plates 37 and 41 and is moved across the work piece by means of the handle 39. Usually, the planer is controlled by the operator gripping the motor housing portion 33, as well as the handle 39.

It is the mounting and power transmitting structure 45 which distinguishes the tool assembly 30 from previously known devices and which constitutes the principal basis for the present invention. This connecting structure 45 is best shown in the detail view of FIGS. 9 through 13.

As indicated in FIGS. 9–13, the forward or gear box portion 36 of the housing for the power unit 31 is provided with a shaft opening 46 with which the motor drive shaft 47 is aligned. A first mounting member 48 is affixed to the power unit housing 36; the mounting member 48 comprises a substantially cylindrical mounting element 49 which is disposed in encompassing relation to the shaft opening 46 and thus encompasses the output shaft 47 of the power unit. The mounting member 48 further includes a plurality of mounting shoulders 51 which project outwardly from the cylindrical mounting element 49 and which are angularly spaced around the periphery of the mounting element. In the present instance, there are two of these mounting shoulders 51. The number of mounting shoulders is not particularly critical, however, and three or more such shoulders may be employed if desired. The spacing 52 between adjacent mounting shoulders is preferably made substantially longer, in each instance, than the mounting shoulders.

Figure 13:
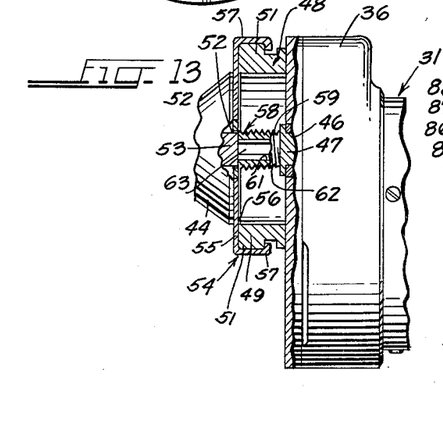
FIG. 13 is a sectional view taken approximately along the line 13—13 in FIG. 10, showing the drive connection for the planer.

As best indicated in FIG. 13, the tool unit housing 44 is also provided with a shaft opening 52 which is aligned with the operating shaft 53 of the planer or like tool unit. A second mounting member 54 is affixed to the housing 44 in encompassing relation to the shaft opening 52. The mounting member 54 includes an annular closure element or base portion 55 which engages the rim 56 of the mounting member 48. The mounting member 54 further includes a pair of arcuate gripping flanges 57 which extend outwardly of the closure element and which are complementary in cross-sectional configuration to the mounting shoulders 51 on the first mounting member 48. The flanges 57 should be substantially smaller in length than the inter-shoulder spaces 52 on the power unit mounting member 48 to permit substantial relative rotation of the two mounting members without engaging the flanges and mounting shoulders. Thus, the tool unit housing 44 may be removably rigidly mounted on the power unit housing 36 simply by alignment of the two mounting members 48 and 54 with each other and by rotating the units through an angle of less than 180° from the disengaged position illustrated in FIG. 12 to the engaged position shown in FIG. 11. Of course, removal of the tool unit from the power unit is accomplished with equal facility by rotating the two units from the mounted or engaged position of FIG. 11 back to the detaching position of FIG. 12.

The mounting members 48 and 54 do not provide for transmission of power between the power unit 31 and the tool unit 32 (see FIG. 1). This independence of the tool and power unit mounting arrangement from any torque or power transmitting device constitutes one of the important requirements of the invention, since it makes it possible to avoid supporting any of the weight of the power or tool units on the drive shaft or shafts interconnecting the units. Moreover, the relatively rigid mounting afforded by the mounting members 48 and 54 effectively reduces vibration which might otherwise result if any substantial "play" is permitted between these two units.

The transmission of power between the power unit 31 and the planer unit 32 is accomplished by a relatively simple plug and socket connector 58 which interconnects the motor shaft 47 and the operating shaft 53. In the embodiment illustrated in FIG. 13, the power connector comprises a first connector member 59 which is threaded onto or otherwise suitably secured to the motor shaft 47 for rotation therewith. The connector member 59 is provided with a socket 61 which faces toward the operating shaft 53. The socket 61 may be hexagonal in configuration, as illustrated, or may be of square or other suitable configuration. Furthermore, the external surface of the connector member 59 is preferably provided with a thread, as indicated by reference numeral 62, for a purpose described hereinafter.

The connector 58 further comprises a second connector member 63 which is affixed to the operating shaft 53 of the tool unit. In this instance, the connector member 63 comprises a hexagonal shaped plug or extension portion of the shaft 53 and is complementary in size and configuration to the socket 61. The connector member 63 may be constructed as a separate member and may be suitably affixed to the operating shaft 53. Preferably, however, in this particular construction, the second connector member constitutes an integral part of the tool unit shaft.

When the tool unit 32 is mounted upon the power unit 31, it is of course necessary to engage the two connector members 59 and 63 with each other, as well as to engage the mounting members 48 and 54 with each other. For this reason, it is essential that at least one of the connector members project outwardly of the motor or tool unit housing with which it is associated, in order that the plug and socket connection may be completed before the two units are mounted on each other. Preferably, both of the connector members project outwardly of the corresponding housing by a substantial distance, as illustrated in FIG. 13. This is highly desirable in that it facilitates engagement of the connector members 59 and 63 before the two mounting members 48 and 54 are engaged with each other and therefore assists in establishment of the desired torque-transmitting connection between the two shafts. The relation noted hereinabove with respect to the angular extent of the shoulders 51 and of the gripping flanges 57 relative to the spaces 52 between the shoulders, is also important in this regard, because it permits relative rotation of the tool and power units for the purpose of aligning the two connector members 59 and 63 before completion of mounting of the tool unit on the power unit. This feature of the inventive structure permits ready and accurate alignment of the plug and socket connector 58 without interfering with mounting of the tool unit on the motor unit.

Figure 9:
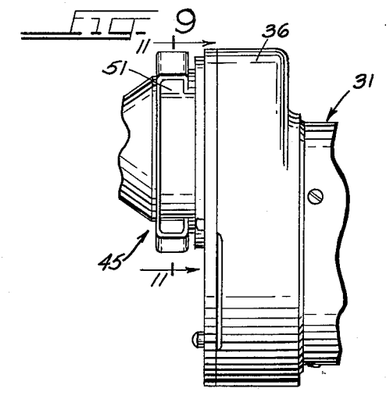
FIG. 9 is an enlarged fragmentary elevation view illustrating the mounting arrangement employed in the planer of FIGS. 1 and 2.
Figure 10:
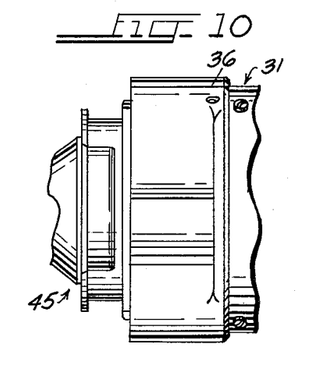
FIG. 10 is an enlarged fragmentary plan view of the mounting arrangement for the planer.
Figure 11:
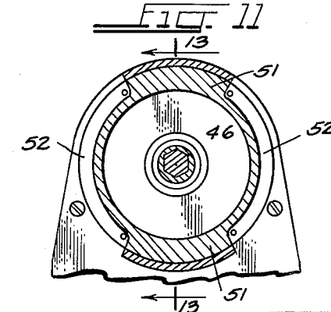
FIG. 11 is a sectional view, taken approximately on the line 11—11 in FIG. 9 and illustrating the mounting arrangement in assembled condition.
Figure 12:
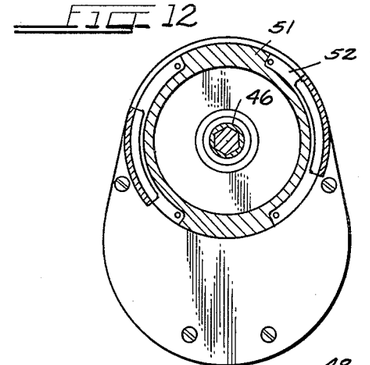
FIG. 12 is a sectional view, similar to FIG. 11, but showing the mounting arrangement in unassembled condition.

As indicated in FIGS. 9 and 10, the mounting members 48 and 54 completely enclose the shaft connections for the tool assembly. Consequently, it is not possible for the operator to injure himself by accidentally bringing fingers or other parts of his body into contact with the shaft connecting the power and tool units. On the other hand, and as noted hereinabove, the completely enclosed arrangement of the connecting structure 45 does not interfere with rapid and convenient removal of the tool unit from the power unit, since it is a relatively simple and easy manner to align the shaft connector members with each other before engagement of the mounting members.

FIGS. 3 through 8 illustrate a variety of different tool units which may be utilized in conjunction with the same power unit 31 as is employed in the planer assembly 30. Thus, FIGS. 3 and 4 show the power unit 31 connected to an oscillating sander 64. The tool unit 64 is substantially conventional in construction, in most respects, and translates rotary movement of an input or operating shaft (not shown) into reciprocating movement of a base member 65 upon which a sheet of abrasive or buffing material may be mounted. The sander unit 64 is provided with mounting and connector members of the kind described hereinabove in connection with FIGS. 9 through 13, including the mounting member 54A which engages the mounting member 48 on the power unit 31. Of course, the internal power connector on the sander may be substantially similar in construction to that described for the planer of FIGS. 1 and 2.

Figures 5, 6:
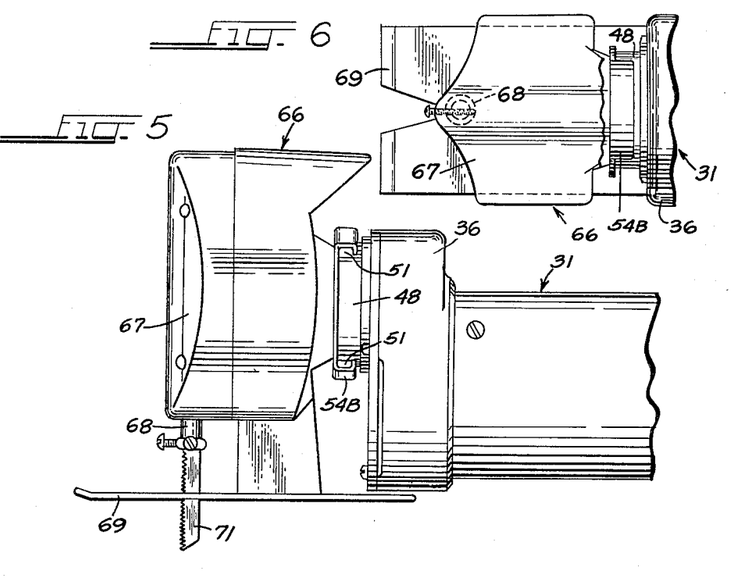
FIG. 5 is a side elevation view of a saber saw attachment incorporated in a power tool assembly according to the invention.
FIG. 6 is a plan view of the saber saw of FIG. 5.

FIGS. 5 and 6, on th other hand, show the power unit 31 connected in driving relationship to a saber saw unit or attachment 66. The saw unit 66 includes a suitable mechanism, disposed within a housing 67, for translating rotary motion of an input shaft (not shown) into reciprocating movement of the saw holder 68. The saber saw 66 may of course include the usual bifurcated guide plate 69 through which a saw blade 71 extends, the saw blade being mounted to the saw holder 68 in the conventional manner.

As in the previously described embodiments, the saw unit 66 is provided with a suitable mounting plate 54B which engages the mounting plate 48 on the power unit 31 to removably rigidly mount the saw unit on the power unit. Moreover, the internal construction of the connection between the two units may be essentially similar to that shown in FIG. 13, including a suitable plug connector member for engaging the socket connector member 59 on the power unit shaft.

Figures 7, 8:
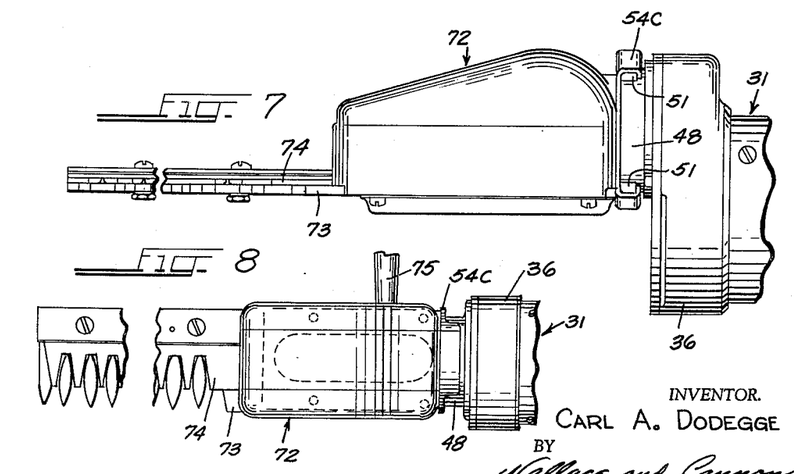
FIG. 7 is a side elevation view of a hedge trimmer attachment and power unit constructed in accordance with the invention.
FIG. 8 is a plan view of the hedge trimmer of FIG. 7.

FIGS. 7 and 8 illustrate another embodiment of the invention, in which the power unit 31 is taken from the work shop and employed for gardening purposes. In this instance, the power unit is connected to a hedge trimmer 72. The hedge trimmer 72, insofar as its operating members are concerned, may be of substantially conventional construction and may include a suitable mechanism for translating rotary motion of an input shaft (not shown) into linear reciprocating motion of one blade 73 of the hedge trimmer. The blade 73 is aligned with a second stationary blade 74 in the usual manner, both blades being provided with a plurality of teeth to afford the desired clipping action. The hedge trimmer unit 72 may be provided with an auxiliary handle 75 to permit the operator to grasp the tool assembly with both hands when in use.

The hedge trimmer unit 72 is provided with a mounting member 54C which is substantially similar in construction to the mounting member 54 described hereinabove in connection with FIGS. 9–13. The mounting member 54C engages the mounting shoulders on the motor unit mounting member 48 to afford a conveniently removable, yet highly rigid structural connection between the power and tool units. As before, the internal torque transmitting connection may be provided by a plug and socket connector of the kind illustrated in FIG. 13. Thus, the connection between the two units is essentially the same as described in detail in connection with the planer illustrated in FIGS. 1 and 2.

A number of modifications may be made in the mounting and power connecting structures without departing from the invention. One modification of the plug and socket torque transmitting connection is illustrated in FIG. 14, which is otherwise substantially similar to FIG. 13.

Figure 14:
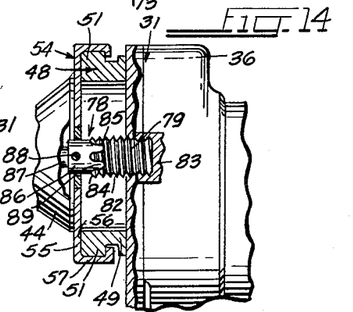
FIG. 14 is a sectional view, similar to FIG. 13, illustrating a modified construction for the drive connection.

In the embodiment of FIG. 14, the motor unit 31 is again provided with a mounting member 48 comprising a mounting ring 49 having a plurality of shoulders 51 extending outwardly thereof. The shoulders 51 are engaged in gripping relation by the flanges 57 on the tool unit mounting member 54. In addition, the rim portion 56 of the mounting member 48 is engaged by the base 55 of the tool unit mounting member. Of course, the mounting members 48 and 54 are rigidly mounted upon the housing 36 and 44, respectively, of the power and tool units. It is thus seen that the mounting arrangement in this instance is the same as described hereinabove.

In the embodiment of FIG. 14, however, a substantially different plug and socket connector 78 is utilized in place of the connector described in connection with the embodiment of FIG. 13. The plug and socket connector 78 comprises a first connector member 79 having an external thread 82 thereon. The thread 82 may be utilized to mount the connector member 79 within a suitable threaded end portion of the motor shaft 83, which corresponds to the motor shaft 47 in the previously described embodiment. The outer or connecting end of the connector member 79, however, does not comprise a hexagonal, square, or other similar socket. Rather, the output end of the connector member 79 is provided with a series of alternate projections and apertures 84 and 85.

The tool unit connector member 86 in the embodiment of FIG. 14 comprises a separate element which is affixed to the operating shaft 87 of the tool unit by suitable means such as a set screw 88. The connector member 86 is of substantially cylindrical configuration and affords a series of connector fingers 89 which correspond in number and configuration to the slots 85 in the connector member 82.

Assembly of the tool unit and the power unit in the embodiment of FIG. 14 is accomplished in the same manner as with the previously described embodiment. As before, the two principal units of the tool assembly are aligned with each other and the connector member 86 is engaged with the connector member 82 by locating the projections 89 in the slots 85. Once this torque transmitting connection has been completed, the two units are rotated with respect to each other to bring the two mounting members 48 and 54 into mounting engagement with each other in exactly the same manner as described hereinabove in connection with FIGS. 11 and 12. Of course, demounting of the tool unit is also achieved in the manner described hereinabove. The principal advantage afforded by the connector 78 results from the provision of multiple bearing surfaces as afforded between two sets of connector projections 84 and 89 as the connectors are aligned and engaged with each other. This type of connector tends to be somewhat more durable, particularly under heavy load conditions, than the structure described in connection with FIG. 13. On the other hand, the construction illustrated in FIG. 14 is also somewhat more expensive and therefore may not be justified in some instances where relatively heavy loads on the tool units are not expected.

FIGS. 15 through 18 illustrate another aspect of the invention and show the application of the invention to a drill press. The drill press assembly 91 shown in FIG. 15 comprises a stand 92 including a base 93 and a vertical support member 94. Preferably, the vertical support member 94 comprises a rod or cylinder which is mounted upon the base 93 by a threaded connection into a boss 95, which constitutes an integral part of the base.

Figures 15, 16, 17, 18:
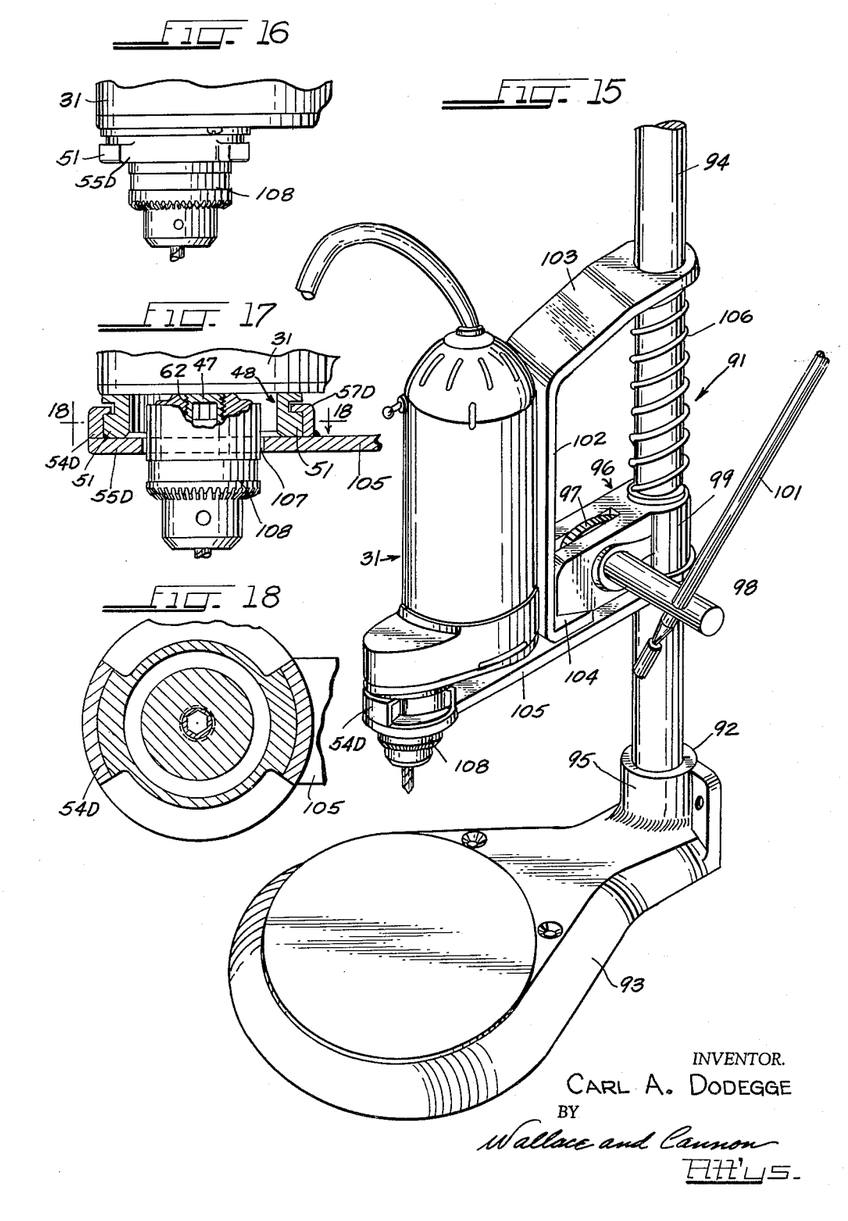
FIG. 15 is a perspective view of a drill press including a power tool assembly constructed in accordance with the invention.
FIG. 16 is a fragmentary elevation view, drawn to an enlarged scale, showing the mounting of the drill chuck in the apparatus of FIG. 15.
FIG. 17 is a vertical sectional view of the drill chuck and mounting arrangement for the drill press of FIG. 15.
FIG. 18 is a detail sectional view taken approximately along 18—18 in FIG. 17.

A feed mechanism 96 is mounted in fixed position upon the vertical support rod 94. The feed mechanism includes a spur gear 97 which is mounted upon a shaft 98, the shaft being suitably journaled in the housing 99 of the drive mechanism. The shaft 98 extends outwardly of the housing and a suitable operating handle 101 is mounted on the shaft extension to afford a means for rotating the shaft.

The spur gear 97 engages a rack (not shown) which is affixed to a bracket 102. The bracket 102 includes an extension portion 103 which engages the vertical support rod 94, the support rod 94 serving to guide vertical movements of the bracket. The lower portion 104 of the bracket 102 is affixed to a support member 105 which extends horizontally outwardly from the vertical support rod 94 and which also engages the vertical rod. A compression spring 106 is disposed in encompassing relation to the vertical support rod 94 intermediate the bracket extension 103 and the feed mechanism housing 99.

The operation of the drill press stand 92, as thus far described, is exceedingly simple. To lower the support member 105, the operator of the drill press employs the handle 101 to rotate the shaft 98 in a counter clockwise direction as seen in FIG. 15. Rotation of the shaft also rotates the gear 97 and drives the bracket 102 downwardly by virtue of engagement of the gear with the aforementioned rack on the bracket. The downward movement of the bracket 102, of course, moves the support member 105 downwardly, since the bracket and the support member are rigidly affixed to each other. In this manner, the support member 105 may be easily and effectively moved in a vertical direction to bring a tool unit mounted on the support member into engagement with a work piece disposed on the base 93 of the drill press. Of course, when the operator releases the handle 101, the bracket 102 and the support member 105 are returned to their initial position, as shown in FIG. 15, by the spring 106.

The drill press assembly 91 utilized the same motor unit 31 as described hereinabove in connection with the other tool assembly embodiments of the invention. In this instance, however, a second mounting member 54D corresponding to the mounting member 54 (FIGS. 9–13) is affixed to the support member 105 of the drill press stand. The mounting member 54D is provided, of course, with suitable gripping flanges 57D for engaging the mounting shoulders 51 on the mounting member 48 of the power unit. Furthermore, the mounting member 54D is preferably provided with a base portion 55D which engages the rim of the power unit mounting member 48 and affords a firm seat for the power unit. It should be noted that the support member 105 and the mounting member 54D are each provided with a relatively large aperture as indicated by reference numeral 107.

In the drill press assembly 91, since the power unit is directly mounted upon the support member 105, there is no need to afford a separate mounting connection between the power unit 31 and a tool unit. This is particularly true because the tool unit in this instance comprises a drill chuck 108, which is relatively light in weight and therefore imposes no substantial mounting burden upon the motor shaft. In this instance, instead of the plug and socket power connection employed in the previously described embodiments, the drill chuck 108 is mounted upon the connector member 59 on the motor shaft by engagement with the external threaded portion 62 thereof. Stated differently, the drill chuck is provided with a tapped opening for receiving the thread 62 on the motor shaft connector member 59 and the rotary tool member is thus directly mounted on the output shaft of the power unit.

Because of the relatively large size of the openings 107 in the support member 105 and the mounting member 54D, the drill chuck 108 may be mounted on the power unit 31 before the power unit is mounted on the drill stand. Thus, to assemble the complete drill press of FIG. 15, it is only necessary to thread the drill chuck onto the power unit connector member 59 and subsequently to engage the power unit and drill stand mounting members with each other as illustrated in FIG. 15. Of course, the power unit and the drill chuck may be removed, as a complete unit, from the drill stand simply by rotating the power unit through an angle of less than 180° and lifting it from the stand. It is thus possible to utilize the power unit and drill chuck assembly as a hand drill at one time, and immediately thereafter, to install the same in the drill press stand 92 for operation of the drill press.

Figure 19:
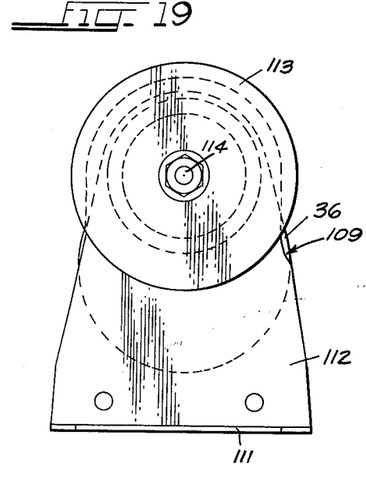
FIG. 19 is a front elevation view of a tool assembly including an abrading tool and stand constructed in accordance with the invention.
Figure 20:
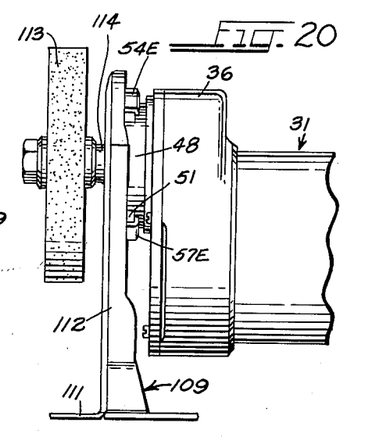
FIG. 20 is a side elevation view of the tool assembly of FIG. 19.

FIGS. 19 and 20 illustrate another embodiment of the invention in which a separate stand is employed for a power tool assembly. In this instance, the stand 109 is a relatively simple sheet metal member affording a base portion 111 and an upright support member 112. The base 111 is utilized to fasten the stand 109 to a work bench or other suitable support.

The upper portion of the vertical support member 112 has affixed to it a mounting member 54E, which is substantially similar to the tool unit mounting members described hereinabove. Thus, the mounting member 54E provides a plurality of gripping flanges 57E for engaging the mounting shoulders 51 on the motor unit mounting member 48. Accordingly, the motor unit 31 may be quickly and conveniently mounted upon the vertical support member 112 merely by engaging the two mounting members 48 and 54E with each other in exactly the same manner described hereinabove.

The tool stand 109 may be utilized with a number of rotary tools which may be mounted on the motor unit 31 and which may be readily interchanged with each other. In the arrangement illustrated in FIGS. 19 and 20, the rotary tool comprises a grinding or other abrading wheel 113 which is mounted upon a shaft 114 for rotation therewith. The shaft 114 is provided with a threaded end portion for engaging the external thread 62 on the motor unit power connector in essentially the same manner as described hereinabove for the chuck 18 (see FIG. 17). Of course, when a different grinding or polishing wheel is required, it is a simple matter to unscrew the shaft 114 from the power unit and replace the wheel 113 with a different abrading wheel affording a similar shaft connection.

Figures 21, 23:
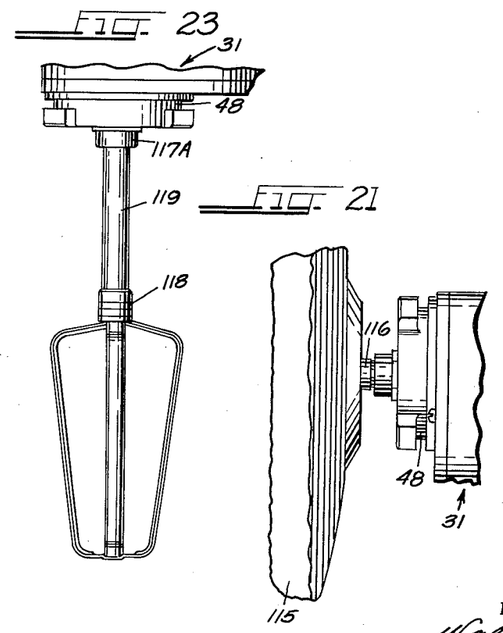
FIG. 21 is a fragmentary elevation view of a buffer mounted upon a power unit constructed in accordance with the invention.
FIG. 23 is a fragmentary elevation view showing a beater attachment connected to a power unit constructed in accordance with the invention.
Figure 22:
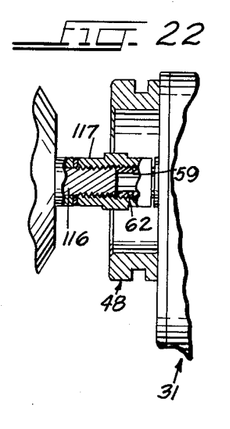
FIG. 22 is a fragmentary sectional view taken through the axis of the drive shaft of the arrangement illustrated in elevation in FIG. 21.

FIGS. 21 and 22 illustrate another arrangement for mounting a rotary tool directly upon the motor unit 31; this arrangement may be employed either with or without a stationary stand such as the stand 109 of FIGS. 19 and 20. In this instance, a buffing or polishing wheel 115 having an externally threaded operating shaft 116 is mounted upon the power unit 31. For this purpose, a bushing 117 having an internal threaded opening is mounted upon the motor shaft connector member 59 by engagement with the external threaded portions 62 of the connector member. The bushing, in turn, engages the threaded portion of the buffer shaft 116 and thus affords both a support and torque transmitting connection between the power unit 31 and the buffer wheel. Of course, it is preferable that the bushing 117 be mounted upon the buffer shaft 116 before the buffer is mounted upon the power unit 31. In most instances, the bushing 117 would probably be permanently affixed to the buffer shaft to expedite removal and replacement of the buffer upon the power unit.

FIG. 23 illustrates another arrangement by which the power unit 31 may be employed in an environment other than a work shop. In this instance, a beater member 8 is mounted on the power unit, thus affording a convenient portable mixer for kitchen use or for the mixing of paint or the like. The shaft 119 of the beater 118 may be fitted with a bushing 117A corresponding to the bushing 117 to provide a convenient and effective means for mounting the beater upon the power unit.

Figures 24, 25:
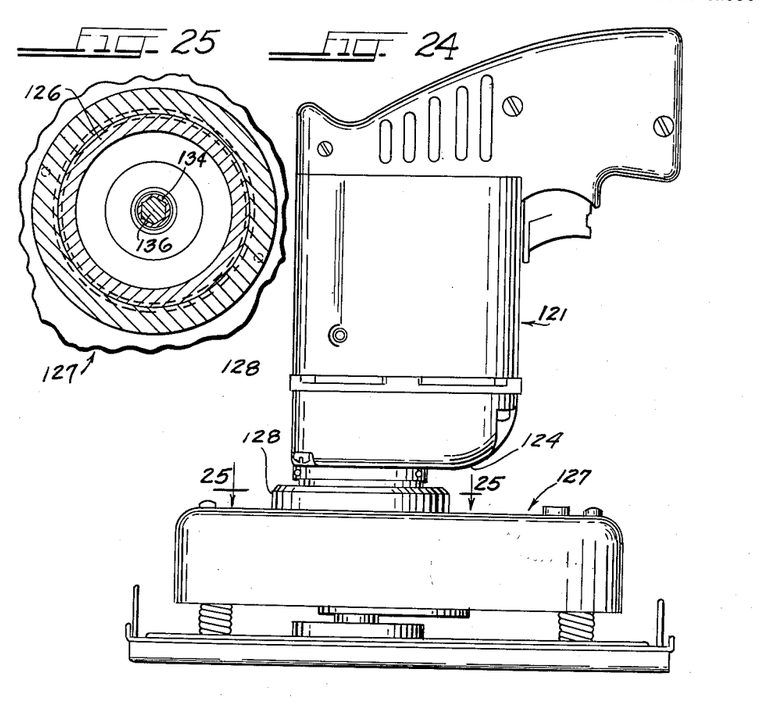
FIG. 24 is an elevation view of a power tool assembly constructed in accordance with another embodiment of the invention and utilizing a hand drill to drive an oscillating sander.
FIG. 25 is a detail sectional view taken approximately along lines 25—25 in FIG. 24.
Figure 26:
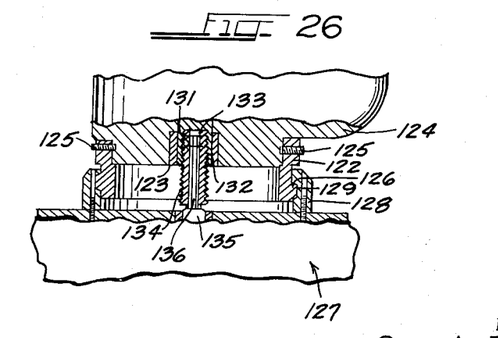
FIG. 26 is a detail sectional view of the mounting arrangement employed in the embodiment of FIG. 25.

FIGS. 24 through 26 illustrate another embodiment of the invention in which a somewhat different power unit is employed and in which the mounting members connecting the power and tool units are modified to a substantial extent. In this instance, the power unit 121 comprises a conventional power drill rather than a separate power unit especially constructed for use in the invention. The drill 121, is modified however, by affixing thereto a mounting member 122, the mounting member being disposed in encompassing relation to the shaft opening 123 in the forward end of the housing 124 of the power drill. The mounting member 122, may, for example, be secured to the power unit housing 124 by means of a plurality of set screws 125 or by any other suitable means which is effective to afford a rigid mounting connection between these members.

The mounting member 122 is substantially cylindrical in configuration and extends outwardly of the housing 124 a relatively short distance. In this respect, the mounting member 122 is substantially similar to the mounting member 48 for the power unit 41 (see FIG. 13). In this instance, however, the mounting member is not provided with mounting shoulders. Rather, a thread 126 is formed in the external portion of the mounting member 122, this thread having a relatively high pitch and affording no more than one complete turn around the mounting member.

The tool unit in the embodiment of FIGS. 24–26 comprises an oscillating sander 127 which is substantially similar in construction to the sander 64 described hereinabove in connection with FIGS. 3 and 4. In this instance, however, the tool unit is provided with a mounting member 128 which is complementary to the mounting member 122. That is, the mounting member 128 is substantially cylindrical in configuration and is provided with an internal one-turn thread 129 for engaging the thread 126 on the power unit mounting member 122.

The power unit comprising the drill 121 is provided with the usual internally threaded shaft 131. Into this shaft there is threaded a first connector member 132 which is provided with an internal socket 133 at the outer end thereof. Preferably the thread 134 on the connector member 132 is continued along the length of the connector member to provide for mounting of rotary tools thereon in the manner described in connection with FIGS. 19–23. The operating shaft 135 of the sander 127, on the other hand, terminates in a plug member 136 which is complementary in configuration to the socket 133 in the power unit connector member. Thus, it is seen that the plug and socket connection afforded by the connector members 132 and 136 is substantially similar to that described hereinabove in connection with FIGS. 11–13.

Mounting of the oscillating sander 127 on the power drill 121 is relatively simple and convenient. The two units are brought together and the plug and socket connection is aligned to assure a proper torque transmitting connection. Thereafter, the two units are rotated through an angle of approximately 360° or less with respect to each other to engage the threaded portions 126 and 129 of the power and tool unit mounting members. Removal of the sander 127 of the power drill is effected in substantially the same manner.

Of course, the power drill 121 may also be employed for its original intended purpose as a power drill simply by mounting a drill chuck thereon in the manner illustrated in FIG. 17. Moreover, any one of a wide variety of other tool units may be incorporated in an assembly with the power drill 121, provided the necessary mounting and power connection members are incorporated in the tool units. Of course, it is not essential that the mounting arrangement illustrated in FIG. 26 be employed for the power drill 121; rather, the mounting and power connection arrangements of FIGS. 13 and 14 may be substituted therefor if desired. The only real requirement in this respect is that the choice of mounting and torque connection structures be maintained consistent throughout the system of power tool attachments.

Figure 27:
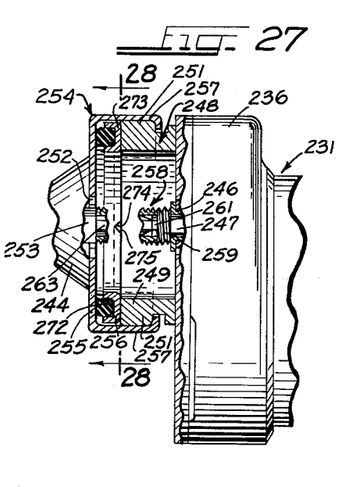
FIG. 27 is a partially sectional elevation view, similar to FIG. 13, of another embodiment of the invention.
Figure 28:
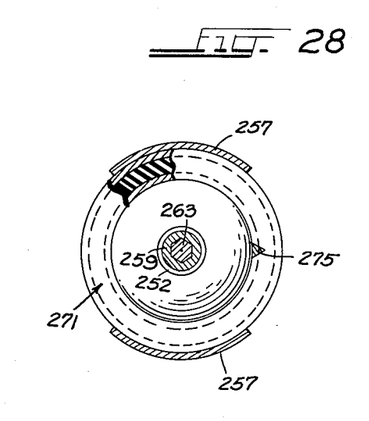
FIG. 28 is a fragmentary sectional view taken approximately along line 28—28 in FIG. 27.

FIG. 27, together with FIG. 28, illustrates another embodiment of the invention which is generally similar to that described hereinabove in connection with FIGS. 9–13, but which includes provisions for a more positive interlock between the power unit and the tool unit of the assembly. The assembly shown in FIGS. 27 and 28 includes the forward or gear-box portion 236 of a housing for a power unit 231, the rear portion of the power unit not being illustrated. The housing portion 236 includes a shaft opening 246 through which the motor drive shaft 247 extends. A motor unit mounting member 248 is fixedly mounted upon the face plate of the gear-box 236. The mounting member 248 includes a generally cylindrical mounting element 249 which is disposed in encompassing relation to the opening 246 and to the output end of the shaft 247. As before, the mounting member 248 is provided with a plurality of mounting shoulders 251 which project outwardly from the mounting element 249 and which may be generally similar in configuration to the mounting shoulders 51 (see FIGS. 9–13). As before, the spacing between adjacent mounting shoulders is preferably made substantially larger than the arcuate length of the shoulders.

The apparatus of FIGS. 27 and 28 also includes a tool unit housing 244 having a shaft opening 252 through which a tool unit shaft 253 extends. The tool unit mounting member 254 is secured to the housing 244; the mounting member 254 includes a base portion 255 and a pair of arcuate gripping flanges 257 which engage the shoulders 251 of the motor unit mounting member. As before, the two shafts 247 and 253 are connected together in torque transmitting relationship by a plug and socket connection including the socket connector element 259 on the motor shaft 247 and the plug connector element 263 on the tool unit shaft 253, the plug element being engaged in the socket 261 of the connector 259. In this instance, however, the base portion 255 of the tool unit mounting member does not engage the rim 256 of the power unit mounting member. Instead, a resilient biasing member 271 is disposed in the base portion of the tool unit and engages the two mounting members to maintain the mounting members in releasable interlocked relation. The biasing member 271 comprises an O ring 272 of rubber or other resilient material. The ring 272 is preferably enclosed in an annular sheath 273 of substantially U-shaped cross sectional figuration. The sheath 273 is preferably fabricated from sheet metal and is employed to protect the O ring 272 against excessive wear. The sheath 273 is provided with an indentation 274 which is engaged by a projection 275 on the mounting member rim 256 when the tool unit and power unit are properly mounted with respect to each other.

Mounting of the power unit and tool unit of FIGS. 27 and 28, with respect to each other, is accomplished in the same manner as described hereinabove in connection with FIGS. 9–13. As in the previously described embodiments of the invention, the two mounting members 248 and 254 enclose the shaft connections and form a relatively rigid mounting connection between the two units of the tool assembly. Thus, torque transmission in the assembly is independent of the mechanical connection between the power and tool units.

In mounting the two units together, it is necessary to press the two mounting members together and to compress the resilient O ring 272 in order to engage the shoulders 251 with the gripping flanges 257. Thus, when the units are in mounted position, the O ring continuously biases the shoulders 251 into an engagement with the gripping flanges 257, holding the mounting members in releasable interlocked relation. The detent arrangement comprising the slot 274 and the lug or projection 275 prevents accidental rotation of the two mounting members with respect to each other. Accordingly, this embodiment of the invention provides more positive assurance of a good mechanical connection between the power and tool units and prevents accidental disengagement of the tool unit from the power unit during use of the tool assembly.

Figure 29:
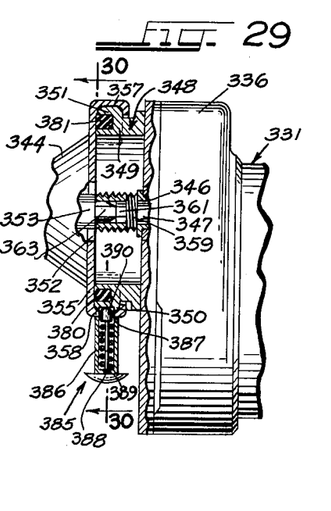
FIG. 29 is a sectional elevation view, generally similar to FIG. 13, of an additional embodiment of the invention.
Figure 30:
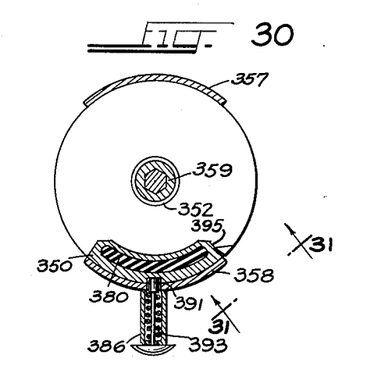
FIG. 30 is a detail sectional view taken approximately along line 30—30 in FIG. 29.
Figure 31:
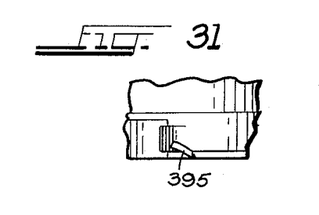
FIG. 31 is a detail view taken approximately as indicated by line 31—31 in FIG. 30.

The embodiment of FIGS. 29–31 is in some respects substantially similar to that of FIGS. 27 and 28, in that it provides for positive interlocking of the mounting members on the tool and power units and also for resilient engagement of those mounting members. The structure, however, is substantially different. Thus, this embodiment of the invention includes a power unit 331 having a forward housing portion 336 which may comprise the gear box of the power unit. The housing 336 is provided with a shaft opening 346 through which the drive shaft 347 extends. As before, the drive shaft is provided with a connector member 359 having a socket 361 into which a complementary connector 363 is fitted in interlocking relationship. The connector 363, in this instance, is an integral part of the shaft 353 of a tool unit, only the housing portion 344 of the tool unit being shown in FIG. 29.

A mounting member 348 is bolted or otherwise fixedly mounted on the power unit housing 336. This mounting member comprises a generally cylindrical mounting element 349 having a pair of arcuate shoulders 350 and 351 extending outwardly thereof. The shoulders 350 and 351 are substantially similar to the corresponding element of the previously described constructions. The tool unit of this embodiment of the invention, on the other hand, is provided with a fixed mounting member 354 having a base portion 355 and a pair of gripping flanges 357 and 358. As before, the tool unit shaft 353 extends through a central aperture 352 in the base portion of the tool unit mounting member. Accordingly, it is seen that the mounting arrangement in this instance is again generally similar to that of FIGS. 9–13.

The embodiment of FIGS. 29–31 further includes a pair of resilient basing elements 380 and 381 which are individually associated with the shoulders 350 and 351, respectively, of the power unit mounting member 348. As best shown in FIG. 30, the biasing element 380 comprises an arcuate insert, formed from rubber or other resilient material, which is mounted within a depression in the face portion of the shoulder 350. The biasing member 381 is of similar construction and is located in a depression in the face of the second mounting shoulder 351 (see FIG. 29). The two biasing elements urge the mounting member 348 away from the base portion 355 of the tool unit mounting member and thus into firm engagement with the gripping flanges 357 and 358 of the tool unit mounting member. Accordingly, it is seen that these two resilient biasing elements afford substantially the same action, in the assembly of FIGS. 29–31, as the O ring 272 in the embodiment of the FIGS. 27 and 28.

The apparatus of FIGS. 29–31 also includes a detent mechanism 385 for preventing relative rotation of the two mounting members when engaged with each other. The detent mechanism 385 includes a tubular housing 386 which is welded to or otherwise affixed to the gripping flange 358 in alignment with an opening 387 in the flange. A rod or plunger 388 is disposed within the tube 386; a knob 389 is mounted upon the external end of the rod 388, whereas the other end of the plunger terminates in a detent element 390. When the power and tool units of the assembly are mounted together, as shown in FIGS. 29 and 30, the detent element 390 is engaged in a slot or aperture 391 in the mounting shoulder 350, thereby preventing relative rotation of the two mounting members of the assembly.

To demount the tool unit 344 from the power unit 331, it is only necessary to pull the knob 389 outwardly of the housing 386, disengaging the detent element 390 from the slot in the shoulder 350. Outward movement of the plunger works against the biasing force exerted by a compression spring 393 which is disposed within the tube 386 and which engages the detent element 390 and the end wall of the tube. With the plunger 388 withdrawn, the tool unit 344 may be rotated with respect to the power unit 331 to demount the two units with respect to each other in the manner described hereinabove with respect to the embodiment of FIGS. 9–13. Of course, the same action is carried out in reverse in mounting the tool unit on the power unit.

To assure proper location of the two mounting members with respect to each other, an additional stop or lug 395 may be struck from or otherwise formed as a part of the tool unit mounting member 354. As best shown in FIGS. 30 and 31, the lug 395 may engage one of the mounting shoulders, in this instance the shoulder 350, to afford an additional means for aligning the two mounting members with respect to each other.

Of course, the mounting arrangements shown in FIGS. 27–31 may be utilized in a tool stand such as the stands illustrated in FIGS. 15 and 20, as well as in conjunction with a complete tool unit. Moreover, stop elements such as the stop 395 may be employed in the embodiments of FIGS. 13 and 27 as well as in the construction of FIG. 29.

Hence, while the preferred embodiments of the invention have been illustrated and described, it is to be understood that these are capable of variation and modification.

I claim:

1. A power tool assembly comprising: a power unit including a motor housing having a shaft opening therein, a motor mounted in said motor housing, and a drive shaft connected to said motor and having an output end aligned with said motor housing opening; a tool unit including a tool housing having a shaft opening therein and an operating shaft having an input end aligned with said tool housing opening; first and second complementary bayonet-type interlocking mounting members affixed to said motor housing and to said tool housing, respectively, for removably rigidly mounting said tool unit on said power unit with said housing openings in alignment with each other but with said housings spaced from each other, said mounting members substantially enclosing said housing openings when said tool unit is in mounted position; a resilient biasing member, comprising a metal-sheathed O-ring, mounted on one of said mounting members in position to engage one surface of the other of said mounting members, for maintaining said members in releasable interlocked relation; and a plug and socket connector comprising first and second connector members affixed to said drive and operating shafts, respectively, for interconnecting said shafts in torque-transmitting relationship, at least one of said connector members projecting outwardly of the corresponding housing to permit engagement of said connector members before engagement of said mounting members.

2. A power tool assembly comprising: a power unit including a motor housing having a shaft opening therein, a motor mounted in said motor housing, and a drive shaft connected to said motor and having an output end aligned with said motor housing opening; a tool unit including a tool housing having a shaft opening therein and an operating shaft having an input end aligned with said tool housing opening; a first mounting member, affixed to one of said housings, comprising a cylindrical mounting element, disposed in encompassing relation to the shaft opening in said one housing, and a plurality of mounting shoulders projecting from said mounting element in angularly spaced relation to each other; a complementary mounting member, affixed to the other of said housings, comprising an annular closure element, a metal-sheathed resilient O-ring mounted in the base of said closure element for engaging the rim of said cylindrical mounting element, and a plurality of gripping flanges extending outwardly of said closure element in position to operatively engage said shoulders and thereby removably rigidly mount said tool unit on said power unit by relative rotation of said units through an arc of less than 180°; and a plug and socket connector comprising first and second connector members affixed to said drive and operating shafts, respectively, for interconnecting said shafts in torque-transmitting relationship.

3. A tool comprising a power unit including a housing having an opening in one side thereof, and drive means including a driven shaft rotatably mounted in said housing in axial alignment with said opening; a tool unit including a second housing having an opening in one side thereof, and driven means including a drive shaft rotatably mounted in said second housing in axial alignment with said opening therein; means releasably connecting said drive shaft to said driven shaft for rotation by the latter; and means for operatively connecting said housings together with said openings disposed in axial alignment with each other, said last mentioned means comprising connecting members mounted on and projecting from said one side of one of said housings, connecting means on said one side of the other of said housings in position to engage said connecting members between said connecting means and said one side of said one housing, said connecting means being movable into and out of said engagement with said connecting members upon oscillation of said housings relative to each other through less than a complete revolution around the axes of said openings in said housings, and resilient means disposed on said other housing between said other housing and said connecting means and engaging said connecting members to urge said housings away from each other and to urge said connecting members toward engagement with said connecting means when said connecting means are so engaged with said connecting members.

4. A tool as defined in claim 3 and which includes complementary detent means on said connecting members and connecting means, respectively, said detent means being engageable, to hold said housings against rotation relative to each other, when said connecting means are so engaged with said connecting members.

5. A tool as defined in claim 3 and in which one of said connecting members has a recess therein, and which includes an elongated plunger reciprocably mounted on said connecting means and reciprocable inwardly and outwardly relative to said connecting means into and out of said means when said connecting means are so engaged with said connecting members, and spring means urging said plunger inwardly relative to said connecting means.

References Cited in the file of this patent

UNITED STATES PATENTS

| | | |
|---|---|---|
| 1,603,478 | Lees | Oct. 19, 1926 |
| 1,785,065 | Abom | Dec. 16, 1930 |
| 1,883,392 | Moll | Oct. 18, 1932 |
| 1,899,883 | Sacrey | Feb. 28, 1933 |
| 2,539,003 | Agustoni | Jan. 23, 1951 |
| 2,643,581 | Wehrenfennig | June 30, 1953 |
| 2,726,689 | Busby | Dec. 13, 1955 |
| 2,808,085 | Hollien et al. | Oct. 1, 1957 |

FOREIGN PATENTS

| | | |
|---|---|---|
| 19,503 | Great Britain | Sept. 1, 1911 |
| 403,651 | Italy | May 4, 1943 |